Figure 1:
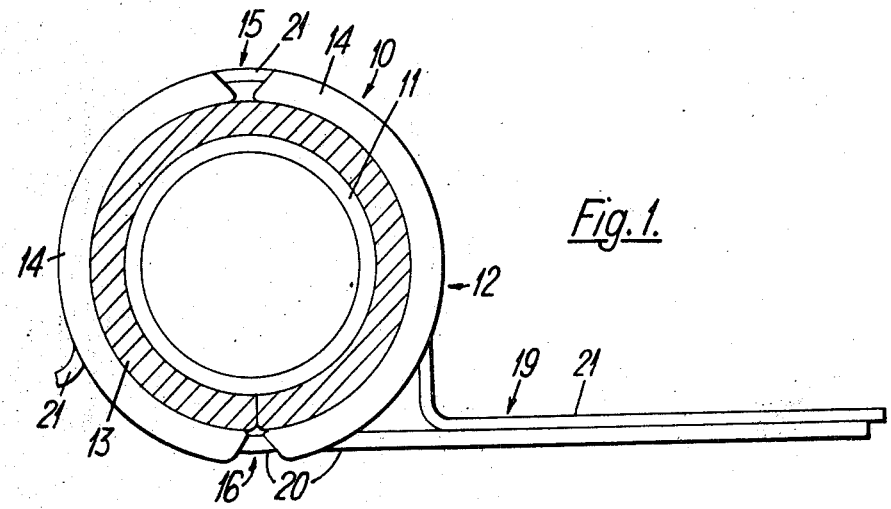

United States Patent

[11] 3,565,374

| | | |
|---|---|---|
| [72] | Inventor | Ronald Jones<br>Derby, England |
| [21] | Appl. No. | 777,802 |
| [22] | Filed | Nov. 21, 1968 |
| [45] | Patented | Feb. 23, 1971 |
| [73] | Assignee | Rolls-Royce Limited<br>Derby, England |
| [32] | Priority | Dec. 1, 1967, Apr. 22, 1968 |
| [33] | | Great Britain |
| [31] | | 54871 and 18922 |

[54] ANTIVIBRATION MOUNTING
8 Claims, 3 Drawing Figs.

[52] U.S. Cl.................................................. 248/54;
248/74; 248/358
[51] Int. Cl....................................................... F16l 3/08
[50] Field of Search.......................................... 248/54, 55,
49, 74, 204, 62, 358 (A), 358.1; 138/107

[56] References Cited
UNITED STATES PATENTS

| 2,215,283 | 9/1940 | Adler............................ | 248/54X |
| 2,790,614 | 4/1957 | Miller........................... | 248/358X |
| 3,074,681 | 1/1963 | Kerley.......................... | 248/358A |

Primary Examiner—Chancellor E. Harris
Attorney—Cushman, Darby & Cushman

ABSTRACT: An antivibration mounting comprises two or more part-annular housing members which have a lining of vibration damping metallic material. A hinge-connection is formed between two adjacent members by welding them to the lining. The hinge may be opened to receive a pipe and then closed around the pipe by a resilient clip.

PATENTED FEB 23 1971

3,565,374

SHEET 1 OF 2

Inventor
RONALD JONES
By
Cushman, Darby + Cushman Attorneys

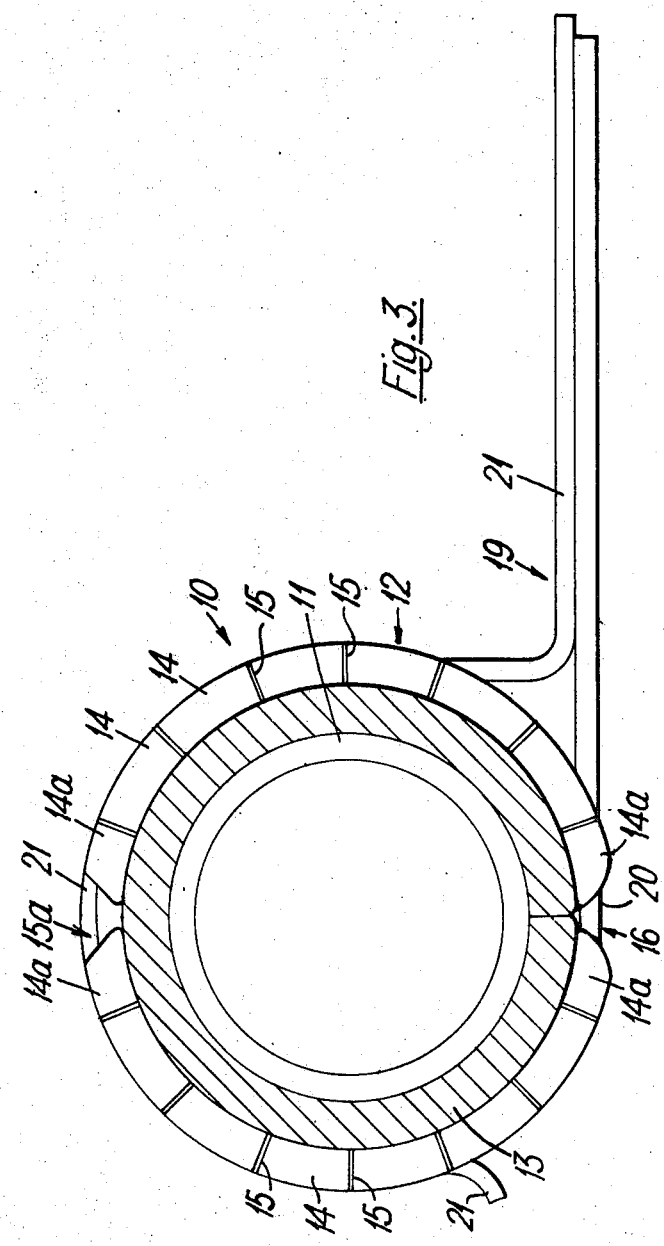

ANTIVIBRATION MOUNTING

This invention concerns antivibration mountings particularly, though not exclusively, for use with pipes.

According to one aspect of the present invention, there is provided an antivibration mounting comprising two housing members, vibration damping material disposed within said members and secured thereto in such a manner as to form a hinge connection therebetween, each said member being formed with an external groove, and a resilient clip which in use is received in the said grooves.

According to another aspect of the present invention, there is provided an antivibration mounting comprising at least three housing members, vibration damping material disposed within said members and secured thereto in such a manner as to form a hinge connection between adjacent ones of said members, each said member being formed with an external groove, and a resilient clip which in use is received in the said grooves.

According to still another aspect of this invention, there is provided an antivibration pipe mounting comprising at least two part-annular housing members, vibration damping material disposed within said housing members and secured thereto in such a manner as to form an openable substantially annular band with adjacent one of said housing members being hingedly connected, each said housing member being formed with an external groove, and a resilient clip which, in use when a pipe is embraced by the said antivibration pipe mounting, is received in said grooves and is securable to permit the said pipe to be supported in position.

Preferably, said vibration damping material is a woven metallic pad which may be welded to each said member.

The said at least two members may be formed or provided with oblique faces.

Figure 2:
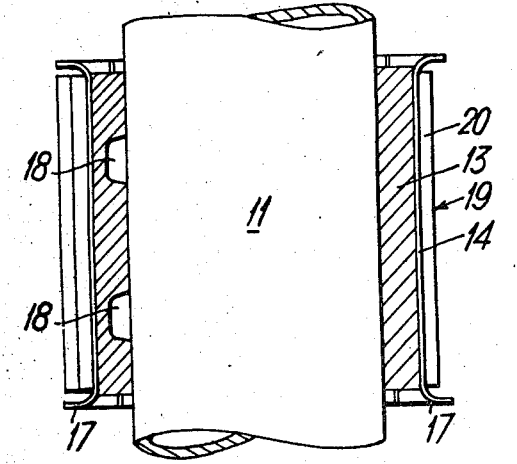

The invention is illustrated, merely by way of example, in the accompanying drawings, in which:

FIG. 1 is an end view partly in section of the antivibration mounting of the present invention, in a form suitable for use with an annular pipe, FIG. 2 is a side elevational view partly in section of the anitvibration mounting of FIG. 1 with certain parts omitted for the sake of clarity and showing the remainder of the structure in a hinged or pipe-receiving position, and FIG. 3 is a view similar to FIG. 1, but showing a modification.

Referring first to FIGS. 1 and 2 of the drawings, there is shown an antivibration mounting 10 for a member which may be subject to undesirable vibration. Thus the member may be a hollow pipe 11 of circular cross section. The mounting 10 comprises a housing 12 and a lining 13 of vibration damping material mounted within the housing 12.

The housing 12 comprises two part-annular housing members 14 which, in the assembled position of FIG. 1, are spaced apart by gaps 15, 16 at each of their ends. As can be seen, the members 14 are provided with oblique faces at said gaps 15, 16, and are formed with radially outwardly flaring substantially semiannular end flanges 17.

The lining 13 is made of what is commonly referred to as "-woven" metallic wire to form a substantially fully annular pad; thus when said mounting 10 is fully assembled as described below, the pad 13 will cover both said gaps 15, 16.

In order to secure together the two housing members 14, the lining 13 is welded to each member 14 adjacent the gap 15, the welds being shown at 18 in FIG. 2.

It will be appreciated that the above-described manner of connecting together the members 14 forms effectively a hinge connection; in other words, the members 14 are free to hinge radially outwardly to increase the size of the gap 16, the length of the pad 13 between the respective welds 18 on the two members 14, and to some extent the obliquity of the faces adjacent the gap, limiting the angular extent of this hinging action.

Thus it will be understood that it is easy to arrange that the maximum size of gap 16 is greater than the outside diameter of pipe 12 so as to render fitting of the mounting 10 around the pipe 12 very simple and trouble-free.

Once the mounting 10 has been fitted around the pipe 12, a two-part resilient spring clip 19 is provided to clamp the members 14 together. The clip 19, which has been omitted from FIG. 2, comprises one substantially J-shaped member 20 and a second member 21 having a stem and a U-shaped portion, the arcuate extent of the latter being greater than 180°. The stems of the members 20, 21 are secured together, e.g. by bolts (not shown), while the ends of their arcuate parts are angularly spaced apart. The members 20, 21 are received in grooves, formed between the substantially semiannular end flanges 17 on the external surfaces of the members 14.

FIG. 3 illustrates an alternative embodiment wherein the parts corresponding to those of FIG. 1 have been given the same reference numbers. In this embodiment, the housing 12 comprises a plurality of arcuate or part-annular housing members 14 and 14a which, in the assembled position of FIG. 3, are spaced apart by gaps 15, 15a and 16. As can be seen, the four members 14a are provided with oblique faces to form the gaps 15a, 16, which gaps are spaced apart by 180°, the members 14, 14a being formed with radially outwardly extending part-annular flanges 17.

The lining or pad 13 in this embodiment will, in the assembled state, cover the gaps 15, 15a and 16, there being a discontinuity in the pad 13 at the gap 16, and is welded to each member 14, 14a.

It will be appreciated that the members 14, 14a are free to hinge radially outwardly to increase the size of the gap 16, only the length of the pad 13 between the respective welds 18 on the two members 14a adjacent the gap 15a, and the abutment of the oblique faces of the said members 14a limiting the angular extent of this hinging action.

It will be appreciated that the illustrated antivibration mounting 10 has a number of advantages. Since the members 14, 14a can hinge, they do not have to be deformed to fit around a pipe, and thus may be made of harder material and of a radius which conforms more closely to that of the pipe. The provision of the resilient clip 19 ensures that, in operation, even when the pad 13 "settles" under the vibration of the pipe 12, the engagement of the pipe with the pad 13 and the continuous damping thereby, is maintained. Also, the manufacturing costs of such a mounting 10 are comparatively low.

Furthermore, the mounting 10 is of particular usefulness for pipes which get hot in operation, e.g. pipes of gas turbine engines carrying hot fluids. The antivibration mounting of this invention may be used at temperatures as high at 450°—500° C. At such temperatures, the clip 19 may be treated with a high-temperature aluminum paint.

While the invention has been described with reference to a mounting for a pipe of circular cross section, it will be clear that such a mounting is applicable to other members subject to vibration and/or other cross sections.

I claim:

1. An antivibration mounting comprising: two housing members, vibration damping material disposed within and secured to said two housing members to form a hinge connection therebetween, each of said two housing members being formed with an external groove, and a resilient clip received in the said grooves to maintain said two housing members and said vibration damping material in a desired configuration.

2. Mounting as claimed in claim 1 wherein said vibration damping material is a woven metallic pad.

3. Mounting as claimed in claim 2 wherein said pad is welded to each said member.

4. Mounting as claimed in claim 1 wherein the said at least two members are provided with oblique faces.

5. An antivibration mounting comprising: at least three housing members, vibration damping material disposed within and secured to said at least three housing members to form a hinge connection between adjacent ones of said at least three housing members, each of said at least three housing members being formed with an external groove, and a resilient clip received in the said grooves to maintain said at least three housing members and said vibration damping material in a desired configuration.

6. An antivibration mounting for securing a pipe comprising: at least two part-annular housing members, vibration damping material disposed within and secured to said housing members to form an openable substantially annular band with adjacent ones of said housing members being hingedly connected, each of said housing members being formed with an external groove, and a resilient clip which, in use when the pipe is embraced by the said antivibration pipe mounting, is received in said grooves and is securable to permit the pipe to be supported in a position.

7. An antivibration mounting for supporting an object having a particular configuration comprising: at least two substantially rigid housing members, a vibration damping pad disposed within and welded to said housing members to form a hinged connection therebetween, said vibration damping pad and said housing members defining a closable band having a configuration similar to the configuration of the object to be supported, each of said housing members having an external groove, and a resilient clip received in each groove to maintain the band about the object with the pad applying continuing damping engagement with the object, said resilient clip being securable to permit the object to be supported.

8. An antivibration mounting as claimed in claim 7 in which said resilient clip comprises a first part embracing part of the grooves in said housing members, and a second part embracing another part of said grooves of said housing member.